(Model.)
L. R. RAOUL, COMTE DE BEAUREPAIRE DE LOUVAGNY.
ROOT AND VEGETABLE WASHER.
No. 253,590. Patented Feb. 14, 1882.
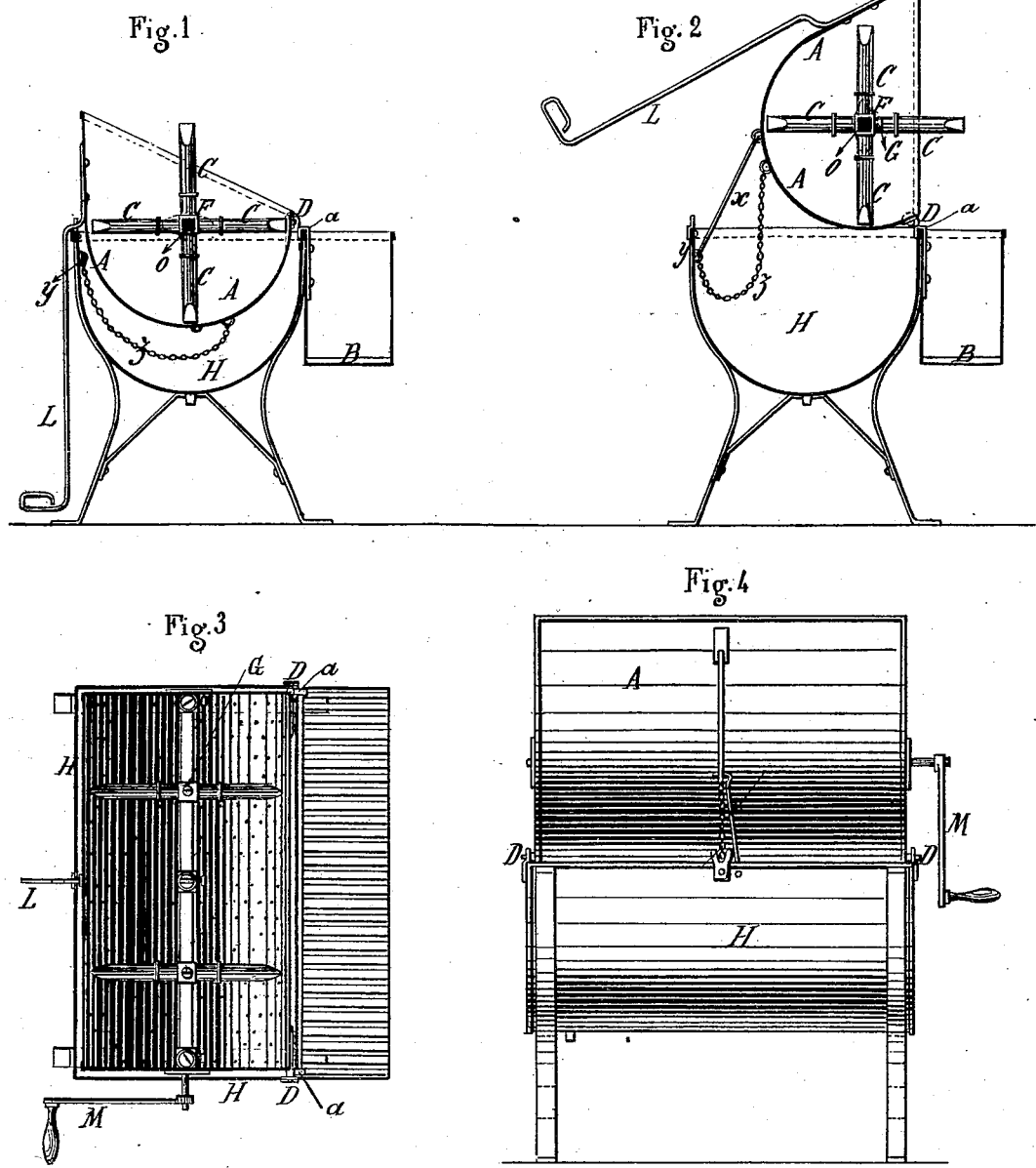

UNITED STATES PATENT OFFICE.

LUDOVIC REINE RAOUL, COMTE DE BEAUREPAIRE DE LOUVAGNY, OF GRIVESNES, FRANCE.

ROOT AND VEGETABLE WASHER.

SPECIFICATION forming part of Letters Patent No. 253,590, dated February 14, 1882.

Application filed October 29, 1879. Renewed November 22, 1881. (Model.)

*To all whom it may concern:*

Be it known that I, LUDOVIC REINE RAOUL, COMTE DE BEAUREPAIRE DE LOUVAGNY, of Grivesnes, France, have invented a new and useful Improvement in Apparatus for Washing Roots, Vegetables, Minerals, &c., which improvement is fully set forth in the following specification and accompanying drawings, in which—

Figures 1 and 2 are vertical sections of the apparatus embodying my invention. Fig. 3 is a top or plan view thereof. Fig. 4 is a side elevation thereof.

Similar letters of reference indicate corresponding parts in the several figures.

My invention consists of a sieve having rotating beaters and hinged to a casing or box, so as to be overturned, whereby roots, vegetables, &c., may be readily washed, cleaned, and dumped. A removable draining-receptacle is hung in proximity to the sieve, so as to receive the roots, &c., therefrom. Means are provided for holding the sieve in an upright position and permitting its full overturning without strain on its hinges.

Referring to the drawings, A represents a semi-cylindrical sieve, which is hinged at one side to a casing, H, the bottom of which may be of semi-cylindrical or other shape.

B represents a grated receptacle or drainer, which is suspended from the side of the casing H, adjacent to the hinges D of the sieve A, the means of suspension being hooks *a*, which permit removal of the drainer.

Mounted on the end walls of the sieve is a shaft, O, on which are mounted a series of blades or beaters, C C, and having a crank-shaft, M, or pulley for hand or power operation. The beaters may be set farther apart or nearer together, so as to be serviceable for roots, vegetables, &c., of varying sizes, and for this purpose each pair of arms has a central boss, F, which receives a squared portion of the shaft O, thus permitting the shifting of the arms, and by means of set-screws G they may be held securely in position.

To the casing H is attached a hook, *x*, which is adapted to engage with the bottom or side of the sieve A, and also a chain, *z*, likewise connected to the sieve. When the hook is not in service it may be folded within the casing H and its nose inserted in an eye, *y*, of said casing.

The operation is as follows: Roots, vegetables, or other articles to be washed are placed in the sieve A and the casing H filled with water to a sufficient height; or a stream of running water may be employed. The shaft O is then rotated so that the beaters move and agitate the articles, and thus completely wash them. The dirt falls through the sieve into the casing and the articles remain in the sieve. When the work is completed the sieve is upturned by means of a lever or handle, L, secured to it. This places the sieve in an upright position, as shown in Fig. 2, and the beaters have a few more turns imparted to them, so as to permit the escape of surplus water and dirt of the sieve into the casing and cause the roots, &c., to fall into the receptacle B, in which they drain. The sieve is held in its upright position by the hook *x*, and when it is overturned to cause the discharge of all the roots, &c., the chain *z* properly limits such overturning and prevents strain on the hinges D. The washed articles may be dumped into a wagon, wheelbarrow, &c., and carried to the required or desired spot. The sieve is returned within the casing H and refilled, if necessary, and the operations of washing and discharging are repeated.

Having thus described my invention, what I claim as new, and desire to secure by Letters Patent, is—

1. The casing H, in combination with the overturning sieve A, provided with the beaters C, substantially as and for the purpose set forth.

2. The casing H and overturning sieve A, with beaters C, in combination with the removable drainer B, suspended from the side of the casing H, adjacent to the hinges D of said overturning sieve A, substantially as and for the purpose set forth.

3. The sieve A and casing H, in combination with the hook *x* and chain *z*, substantially as and for the purpose set forth.

In testimony whereof I have signed my name to this specification before two subscribing witnesses.

CTE. DE BEAUREPAIRE.

Witnesses:
 ROBT. M. HOOPER,
 A. CABY.